US00RE38771E

(19) United States
(12) Reissued Patent
Shibuya et al.

(10) Patent Number: US RE38,771 E
(45) Date of Reissued Patent: Aug. 9, 2005

(54) EXPOSURE CONTROLLER HAVING CORING VALUE ADAPTED TO THE DISCHARGE PULSE COUNT

(75) Inventors: Fuminori Shibuya, Osaka (JP); Keizo Ishiguro, Nara (JP)

(73) Assignee: Matsushita Electric Industrial Co., Ltd., Osaka (JP)

(21) Appl. No.: 10/447,137

(22) Filed: May 29, 2003

Related U.S. Patent Documents

Reissue of:
(64) Patent No.: 6,239,840
Issued: May 29, 2001
Appl. No.: 08/994,941
Filed: Dec. 19, 1997

(30) Foreign Application Priority Data

Dec. 25, 1996 (JP) ..... 8-345206

(51) Int. Cl.[7] ..... H04N 5/235; H04N 5/335; H04N 3/14

(52) U.S. Cl. ..... 348/362; 348/623; 348/627; 348/229.1; 348/221.1; 348/230.1; 348/296; 348/297; 348/299; 348/363

(58) Field of Search ..... 348/623, 627, 348/229.1, 221.1, 230.1, 362, 296, 297, 299, 363

(56) References Cited

U.S. PATENT DOCUMENTS 3,818,494 A * 6/1974 Tanikoshi et al.
4,192,588 A * 3/1980 Wagensonner et al.
4,378,146 A * 3/1983 Suzuki et al.
4,638,366 A * 1/1987 Yoshimura et al.
4,734,777 A * 3/1988 Okino et al.
4,805,024 A * 2/1989 Suzuki et al. ..... 348/296
4,969,045 A * 11/1990 Haruki et al.
5,059,793 A * 10/1991 Miyamoto et al.
5,093,716 A * 3/1992 Kondo et al.
5,144,540 A * 9/1992 Hayes ..... 362/268
5,233,428 A * 8/1993 Alford et al.
5,638,120 A * 6/1997 Mochizuki et al.
5,831,676 A * 11/1998 Takahashi et al. ..... 348/362

FOREIGN PATENT DOCUMENTS

JP 548975 2/1993
JP 5-344415 * 12/1993
JP 6-261248 * 9/1994
JP 8-321986 * 12/1996

* cited by examiner

*Primary Examiner*—Wendy R. Garber
*Assistant Examiner*—James M. Hannett
(74) *Attorney, Agent, or Firm*—Stevens, Davis, Miller & Mosher, LLP

(57) ABSTRACT

An exposure controller comprises a discharge pulse calculation circuit for calculating a discharge pulse count to be output to a solid-state image pickup device within one field period, and a coring circuit for defining the quotient obtained from the discharge pulse count divided by a predetermined setting value and plus 1 as a coring value. In an electronic camera system incorporating an electronic iris, when one discharge pulse changes, the amount of change in the luminance level of an image signal becomes larger as an exposure time becomes shorter, whereby hunting is prevented from occurring at the convergent point of the luminance level, and an exposure controller which is compact and has excellent characteristics can be embodied.

12 Claims, 8 Drawing Sheets

EXPOSURE CONTROLLER HAVING CORING VALUE ADAPTED TO THE DISCHARGE PULSE COUNT

Matter enclosed in heavy brackets [ ] appears in the original patent but forms no part of this reissue specification; matter printed in italics indicates the additions made by reissue.

BACKGROUND OF THE INVENTION

The present invention relates to an exposure controller, more particularly to an exposure controller for a camera incorporating an electronic iris.

Instead of mechanical exposure control, electronic exposure control has recently been used to meet the needs for miniaturization of electronic cameras.

Conventional electronic exposure control has been disclosed in Japanese Laid-open Patent Application No. 5-48975, for example.

A conventional exposure controller is described below. FIG. 8 is a block diagram of this conventional exposure controller. Referring to FIG. 8, numeral 81 represents a rectifier circuit for receiving an image signal from an image pickup device at an input terminal and for rectifying the image signal, numerals 82 and 83 represent comparator circuits, numerals 84 and 85 represent reference voltage setting circuits, numeral 86 represents a counter circuit, and numeral 87 represents an exposure time control circuit for controlling exposure time.

The operation of the exposure controller having the above-mentioned configuration is described below. First, an image signal from the image pickup device is rectified by the rectifier circuit 81. A reference voltage, that is, a potential difference corresponding to the amount of change in the output level of the image signal when the amount of input light entering the image pickup device is doubled, is generated by the reference voltage setting circuit 84. Another reference voltage, that is, a potential difference not less than the above-mentioned potential difference, is generated by the reference voltage setting circuit 85. The two reference voltages generated by the reference voltage setting circuits 84, 85 are compared with the output level of the rectified image signal by the comparator circuits 82, 83, respectively. The count of the counter circuit 86 is incremented, decremented or stopped depending on the outputs of the comparator circuits 82, 83, and the exposure time of the image pickup device is controlled by the exposure time control circuit 87 depending on the output of the counter circuit 86.

However, in the above-mentioned conventional configuration, the level of the picked-up image signal at each exposure time control process changes larger as the exposure time becomes shorter, and the problem of hunting occurs at the convergent point of the image signal level.

Accordingly, an object of the present invention is to provide an exposure controller free from hunting by using a coring value adapted to the discharge pulse count of a solid-state image pickup device.

SUMMARY OF THE INVENTION

A first embodiment of the present invention comprises a lens, a solid-state image pickup device for picking up the image of light having passed through the lens, an AD converter for converting the image picked up by the solid-state image pickup device into a digital signal, a luminance level detector circuit for detecting the luminance level of the image signal digitized by the AD converter, a register having stored the target value of the luminance level, a subtracter for calculating the difference between the luminance level detected by the luminance level detector circuit and the target value of the luminance level, a discharge pulse calculation circuit for calculating a discharge pulse count (hereinafter referred to as sub) to be output to the solid-state image pickup device within one field period on the basis of the polarity of the difference and a discharge pulse hold signal to be output from a coring circuit described later without changing the discharge pulse count when the discharge pulse hold signal is H, or depending on the polarity of the difference between the luminance level and the target value of the luminance level to be output from the subtracter when the discharge pulse hold signal is L, and for outputting sub, an absolute value circuit for calculating the absolute value (hereinafter referred to as a luminance level error) of the difference between the luminance level and the target value of the luminance level to be output from the subtracter, a coring circuit for defining the quotient obtained from sub divided by a predetermined setting value and plus 1 as a coring value, for setting the discharge pulse hold signal at H when the coring value is larger than the luminance level error, or at L in other cases, and for outputting the discharge pulse hold signal, and a drive pulse generator circuit for converting sub into a discharge pulse signal and for outputting the discharge pulse signal to the solid-state image pickup device.

According to this embodiment, when light enters the solid-state image pickup device, the device performs photoelectric conversion, stores charges in a period during which no discharge pulse signal is input, and outputs the charges as an image signal. The luminance level detector circuit assigns weights to the screen center portion of the digitized image signal so as to average luminance levels on the screen, and outputs the average level as the luminance level of the image signal. The subtracter circuit calculates the difference between this luminance level and the target value of the luminance level, which has been stored in a register. The coring circuit defines the value of sub divided by a predetermined value and plus 1 as a coring value, and when luminance level error>coring value the discharge pulse hold signal is set at L, or when luminance level error≦coring value the discharge pulse hold signal is set at H, and the signal is output to the discharge pulse calculation circuit.

The discharge pulse calculation circuit determines the magnitude relationship between the luminance level and the target value depending on the polarity of the luminance input signal, and when luminance level>target value the discharge pulse calculation circuit increments sub so as to shorten the charge time of the solid-state image pickup device and to lower the luminance level, and then outputs sub, or when luminance level≦target value the discharge pulse calculation circuit decrements sub so as to lengthen the charge time of the solid-state image pickup device and to raise the luminance level, and then outputs sub. In case the discharge pulse hold signal is H at this time, sub remains unchanged and is output. The drive pulse generator circuit outputs the discharge pulse signal having the same number of pulses as the value of sub to the solid-state image pickup device.

Since the exposure controller is provided with the coring circuit as described above, this exposure controller can be embodied as an exposure controller free from hunting by using a coring value adapted to the value of the discharge pulse count.

A second embodiment of the present invention, having a coring circuit different from that of the first embodiment, comprises a lens, a solid-state image pickup device for picking up the image of light having passed through the lens, an AD converter for converting the image picked up by the solid-state image pickup device into a digital signal, a luminance level detector circuit for detecting the luminance level of the image signal digitized by the AD converter, a register having stored the target value of the luminance level, a subtracter for calculating the difference between the luminance level detected by the luminance level detector circuit and the target value of the luminance level, a discharge pulse calculation circuit for calculating a discharge pulse count (hereinafter referred to as sub) to be output to the solid-state image pickup device within one field period on the basis of the polarity of the difference and a discharge pulse hold signal to be output from a coring circuit described later without changing sub when the discharge pulse hold signal is H, or depending on the polarity of the difference between the luminance level and the target value of the luminance level to be output by the subtracter when the discharge pulse hold signal is L, and for outputting sub, an absolute value circuit for calculating the absolute value (hereinafter referred to as a luminance level error) of the difference between the luminance level and the target value of the luminance level to be output from the subtracter, a coring circuit for defining the value of a second register as a coring value when sub is not more than the value stored in a first register or for defining the value of a third register as the coring value when sub is more than the value stored in the first register, for setting the discharge pulse hold signal at H when the coring value is larger than the luminance level error, or at L in other cases, and for outputting the discharge pulse hold signal, and a drive pulse generator circuit for converting sub into a discharge pulse signal and for outputting the discharge pulse signal to the solid-state image pickup device.

A third embodiment of the present invention, having a coring circuit different from that of the first embodiment, comprises a lens, a solid-state image pickup device for picking up the image of light having passed through the lens, an AD converter for converting the image picked up by the solid-state image pickup device into a digital signal, a luminance level detector circuit for detecting the luminance level of the image signal digitized by the AD converter, a register having stored the target value of the luminance level, a subtracter for calculating the difference between the luminance level detected by the luminance level detector circuit and the target value of the luminance level, a discharge pulse calculation circuit for calculating a discharge pulse count (hereinafter referred to as sub) to be output to the solid-state image pickup device within one field period on the basis of the polarity of the difference and a discharge pulse hold signal to be output from a coring circuit described later without changing sub when the discharge pulse hold signal is H, or depending on the polarity of the difference between the luminance level and the target value of the luminance level to be output by the subtracter when the discharge pulse hold signal is L, and for outputting sub, an absolute value circuit for calculating the absolute value (hereinafter referred to as a luminance level error) of the difference between the luminance level and the target value of the luminance level to be output from the subtracter, a coring circuit for defining the value obtained by multiplying the target value by the reciprocal of the difference between the number of scanning lines in one field and sub and plus 1 as a coring value, for setting the discharge pulse hold signal at H when the coring value is larger than the luminance level error, or at L in other cases, and for outputting the discharge pulse hold signal, and a drive pulse generator circuit for converting sub into a discharge pulse signal and for outputting the discharge pulse signal to the solid-state image pickup device.

DESCRIPTION OF THE PREFERRED EMBODIMENTS

Figure 1:
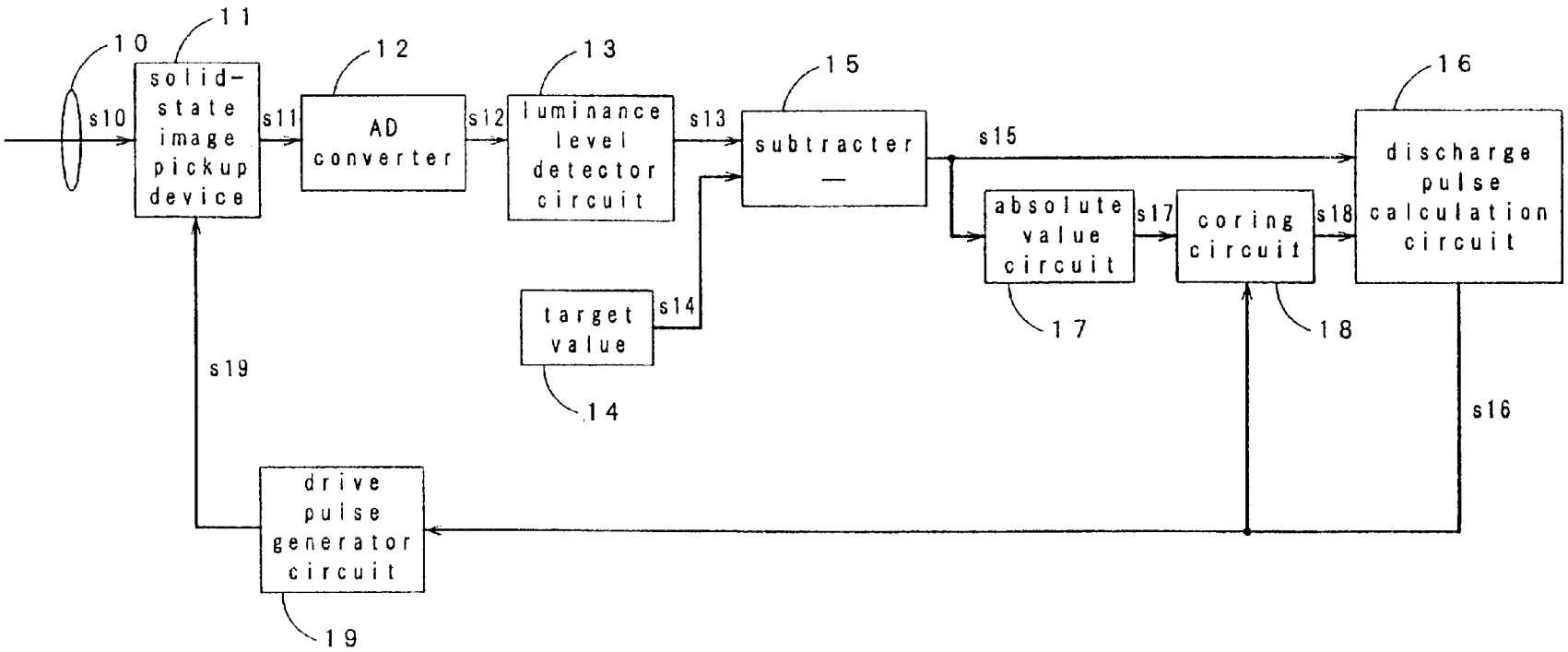
FIG. 1 is a block diagram of an exposure controller in accordance with a first embodiment of the present invention.

A first embodiment of the present invention will be described below referring to the drawings.

FIG. 1 is a block diagram of an entire exposure controller in accordance with the first embodiment of the present invention. Referring to FIG. 1, numeral 10 represents a lens, numeral 11 represents a solid-state image pickup device for picking up the image of light s10 having passed through the lens 10 and for outputting the image as an image signal s11. Numeral 12 represents an A/D converter for converting the image signal s11 into a digital signal s12. Numeral 13 represents a luminance level detector circuit for detecting the luminance level s13 of the digitized image signal s12. Numeral 14 represents a register having stored the target value s14 of the luminance level s13. Numeral 15 represents a subtracter for calculating the difference s15 between the luminance level s13 and the target value s14 and for outputting the difference s15. Numeral 16 represents a discharge pulse calculation circuit for outputting a discharge pulse count (hereinafter referred to as sub) s16 to the solid-state image pickup device 11 within one field period on the basis of the polarity of the difference s15 and a discharge pulse hold signal s18 to be output from a coring circuit 18 described later. Numeral 17 represents an absolute value circuit for calculating the absolute value (hereinafter referred to as a luminance level error) s17 of the difference s15 between the luminance level s13 and the target value s14. Numeral 18 represents a coring circuit for setting the discharge pulse hold signal s18 on the basis of sub s16 and the luminance level error s17 and for outputting the discharge pulse hold signal s18. Numeral 19 represents a drive pulse generator circuit for converting sub s16 into a discharge pulse signal s19 and for outputting the discharge pulse signal s19 to the solid-state image pickup device 11.

The operation of the exposure controller of this embodiment having the above-mentioned configuration is described below. When the light s10 enters the solid-state image pickup device 11, the solid-state image pickup device 11 performs photoelectric conversion, stores charges in a period during which the discharge pulse signal s19 is not input, and outputs the charges as the image signal s11. The luminance level detector signal 13 obtains the average luminance of the digitized image signal s12 and outputs the average luminance as the luminance level s13 of the image signal s12. The subtracter 15 calculates the difference s15 between the luminance level s13 and the target value s14 of the luminance level s13, which has been stored in the register 14. The coring circuit 18 defines the value of sub s16 divided by integer 64 and plus 1 as a coring value, and when luminance level error s17>coring value the discharge pulse hold signal s18 is set at L, or when luminance level error s17≦coring value the discharge pulse hold signal s18 is set at H, and the signal is output to the discharge pulse calculation circuit 16.

The discharge pulse calculation circuit 16 determines the magnitude relationship between the luminance level s13 and the target value s14 depending on the polarity of the luminance input signal s15, and when luminance level s13>target value s14 the discharge pulse calculation circuit 16 increments sub s16 so as to shorten the charge time of the solid-state image pickup device 11 and to lower the luminance level, and then outputs sub s16, or when luminance level s13≦target value s14 the discharge pulse calculation circuit 16 decrements sub s16 so as to lengthen the charge time of the solid-state image pickup device 11 and to raise the luminance level, and then outputs sub s16. In case the discharge pulse hold signal s18 is H at this time, sub s16 remains unchanged and is output.

The drive pulse generator circuit 19 outputs the discharge pulse signal s19 having the same number of pulses as the value of sub s16 to the solid-state image pickup device 11.

Figure 2:
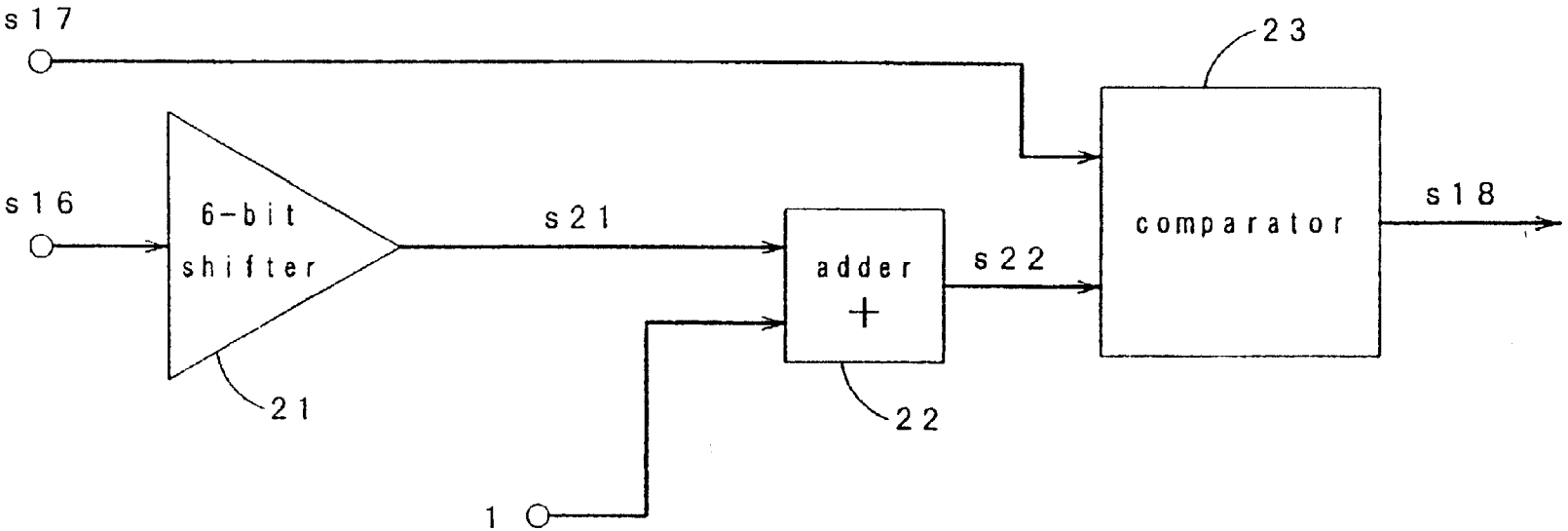
FIG. 2 is a block diagram of a coring circuit in accordance with the first embodiment.

FIG. 2 is a block diagram of the coring circuit 18 of the exposure controller of the present embodiment. Referring to FIG. 2, numeral 21 represents a bit shifter for shifting sub s16 to its LSB side by 6 bits, numeral 22 represents an adder for adding 1 to the value s21 bit-shifted by the bit shifter 21, and numeral 23 represents a comparator for comparing the added value (hereinafter referred to as a coring value) s22 with the luminance level error s17.

The operation of the coring circuit of the present embodiment having the above-mentioned configuration is described below. By the bit shifter 21, sub s16 is shifted by 6 bits to its LSB side, and 1 is added to s21 by the adder 22. As a result, the following equation is established:

coring value s22=sub s16/64+1.

The comparator 23 compares the coring value s22 with the luminance level error s17, and when luminance level error s17>coring value s22 the comparator 23 outputs 0, or when luminance level error s17≦coring value s22 the comparator 23 outputs 1, and this output value is output as the discharge pulse hold signal s18.

As described above, the electronic-iris type exposure controller of the first embodiment, having the drive pulse generator circuit 19 which outputs the discharge pulse signal to the solid-state image pickup device 11 at a rate of an effective scanning period divided by 16 in a vertical blanking period, is provided with the coring circuit 18 which defines sub s16 divided by integer 16 and plus 1 as the coring value s22. This exposure controller can be embodied as an exposure controller free from hunting by using a coring value adapted to the value of sub s16.

Figure 3:
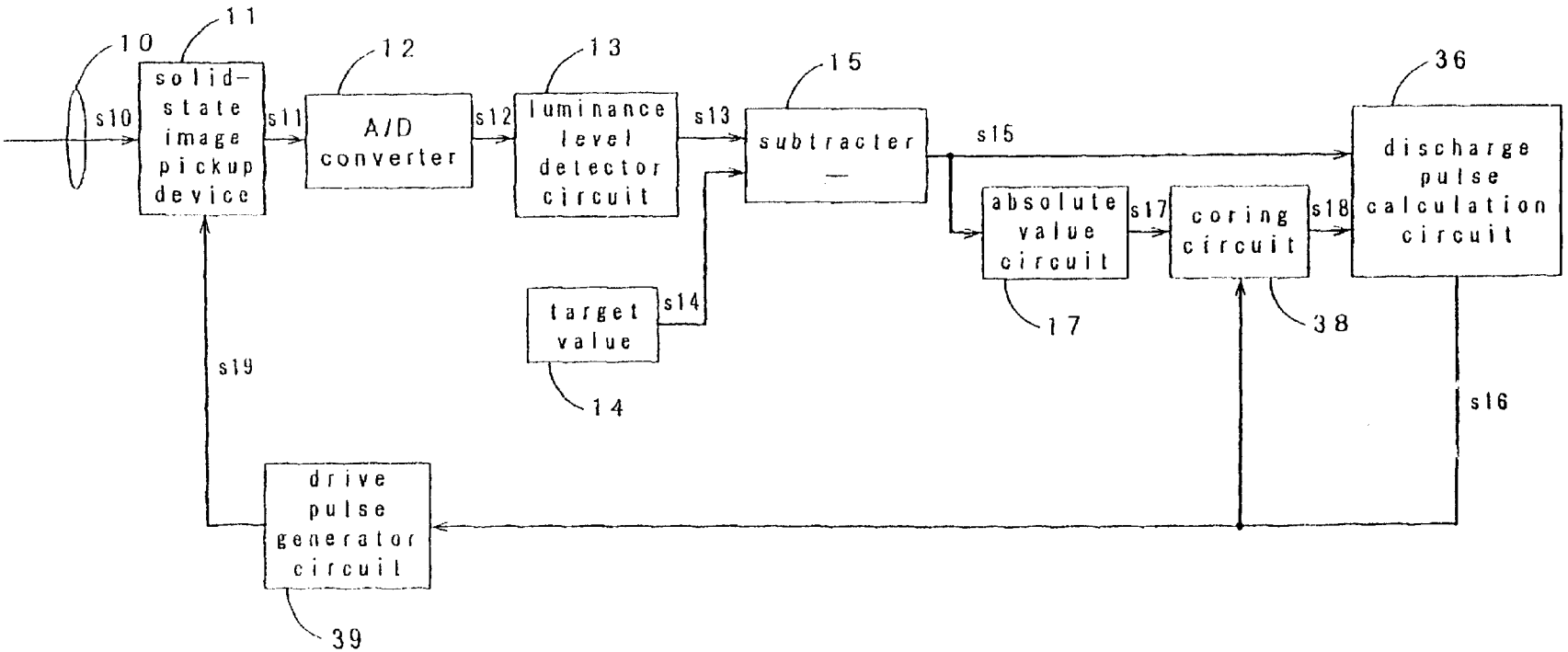
FIG. 3 is a block diagram of an exposure controller in accordance with a second embodiment.

FIG. 3 is a block diagram of an entire exposure controller in accordance with a second embodiment of the present invention. Referring to FIG. 3, numeral 10 represents a lens, numeral 11 represents a solid-state image pickup device for picking up the image of light s10 having passed through the lens 10 and for outputting the image as an image signal s11. Numeral 12 represents an A/D converter for converting the image signal s11 into a digital signal s12. Numeral 13 represents a luminance level detector circuit for detecting the luminance level s13 of the digitized image signal s12. Numeral 14 represents a register having stored the target value s14 of the luminance level s13. Numeral 15 represents a subtracter for calculating the difference s15 between the luminance level s13 and the target value s14 and for outputting the difference s15. Numeral 36 represents a discharge pulse calculation circuit for outputting a discharge pulse count (hereinafter referred to as sub) s16 to the solid-state image pickup device 11 within one field period on the basis of the polarity of the difference s15 and a discharge pulse hold signal s18 to be output from a coring circuit 38 described later. Numeral 17 represents an absolute value circuit for calculating the absolute value (hereinafter referred to as a luminance level error) s17 of the difference s15 between the luminance level s13 and the target value s14. The configuration described above is similar to that shown in FIG. 1. The configuration of the second embodiment only differs from that shown in FIG. 1 in the following two points: the process by the coring circuit 38 differs from the process by the coring circuit 18, and a drive pulse generator circuit 39 converts sub s16 into a discharge pulse signal s19 and outputs the discharge pulse signal s19 to the solid-state image pickup device 11.

Figure 4:
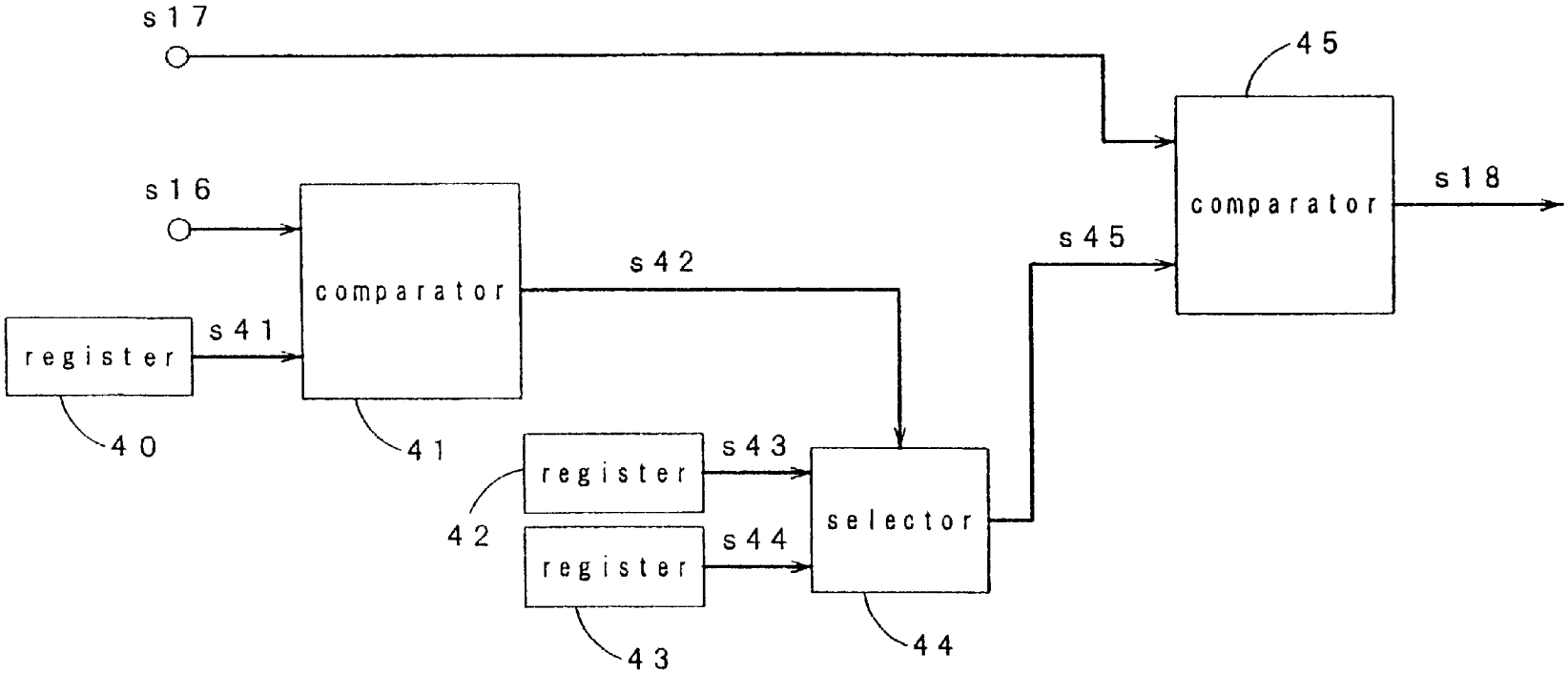
FIG. 4 is a block diagram of a coring circuit in accordance with the second embodiment.

FIG. 4 is a block diagram of the coring circuit 38 of the exposure controller in accordance with the second embodiment. Referring to FIG. 4, numerals 40, 42 and 43 represent registers, numeral 41 represents a comparator for comparing sub s16 with the value s41 of the register 40, numeral 44 represents a selector for outputting the value s43 of the register 42 or the value s44 of the register 43 depending on the output value s42 of the comparator 41, and numeral 45 represents a comparator for comparing the output value (hereinafter referred to as a coring value) s45 of the selector 44 with the luminance level error s17.

The operation of the coring circuit 38 having the above-mentioned configuration is described below. The comparator 41 compares sub s16 with the value s41 of the register 40, and when the result is represented as follows:

sub s16>value s41 of the register 40, the comparator 41 outputs 1, and in other cases, the comparator 41 outputs 0. If the output value s42 of the comparator 41 is 1, the selector 44 outputs the value s43 of the register 42 as the coring value s45. If the output value s42 is 0, the selector 44 outputs the value s44 of the register 43 as the coring value s45. The comparator 45 compares the luminance level error s17 with the coring value 45, and when luminance level error s17>coring value s45 the comparator 45 outputs 0, or when luminance level error s17≦coring value s45 the comparator 45 outputs 1. This output value is output as the discharge pulse hold signal s18.

As described above, the electronic-iris type exposure controller of the second embodiment is provided with the coring circuit 38 which changes the coring value s45 depending on whether the value of sub s16 is larger than the value s41 of the register 40 or not. This exposure controller can be embodied as an exposure controller free from hunting by using a coring value adapted to the value of sub s16.

Figure 5:
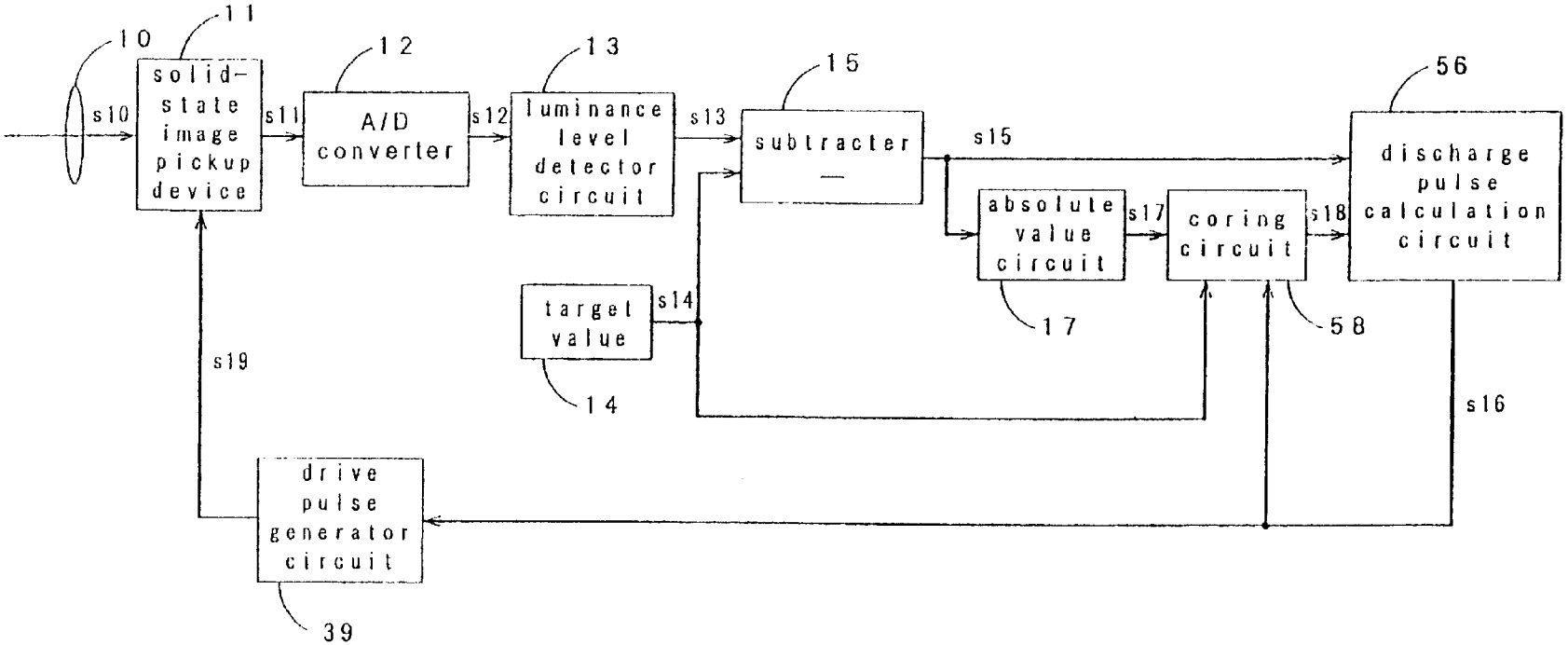
FIG. 5 is a block diagram of an exposure controller in accordance with a third embodiment.

FIG. 5 is a block diagram of an entire exposure controller in accordance with a third embodiment of the present invention. Referring to FIG. 5, numeral 10 represents a lens, numeral 11 represents a solid-state image pickup device for picking up the image of light s10 having passed through the lens 10 and for outputting the image as an image signal s11. Numeral 12 represents an A/D converter for converting the image signal s11 into a digital signal s12. Numeral 13 represents a luminance level detector circuit for detecting the luminance level s13 of the digitized image signal s12. Numeral 14 represents a register having stored the target value s14 of the luminance level s13. Numeral 15 represents a subtracter for calculating the difference s15 between the luminance level s13 and the target value s14 and for outputting the difference s15. Numeral 56 represents a discharge pulse calculation circuit for outputting a discharge pulse count (hereinafter referred to as sub) s16 to the solid-state image pickup device 11 within one field period on the basis of the polarity of the difference s15 and a discharge pulse hold signal s18 to be output from a coring circuit 58 described later. Numeral 17 represents an absolute value circuit for calculating the absolute value (hereinafter referred to as a luminance level error) s17 of the difference s15 between the luminance level s13 and the target value s14. Numeral 39 represents a drive pulse generator circuit for converting sub s16 into a discharge pulse signal s19 and for outputting the discharge pulse signal s19 to the solid-state image pickup device 11. The configuration described above is similar to that shown in FIG. 1 or 3. The configuration of the third embodiment only differs from that shown in FIG. 1 or 3 in that the process by the coring circuit 58 differs from the process by the coring circuit 18 or 38.

Figure 6:
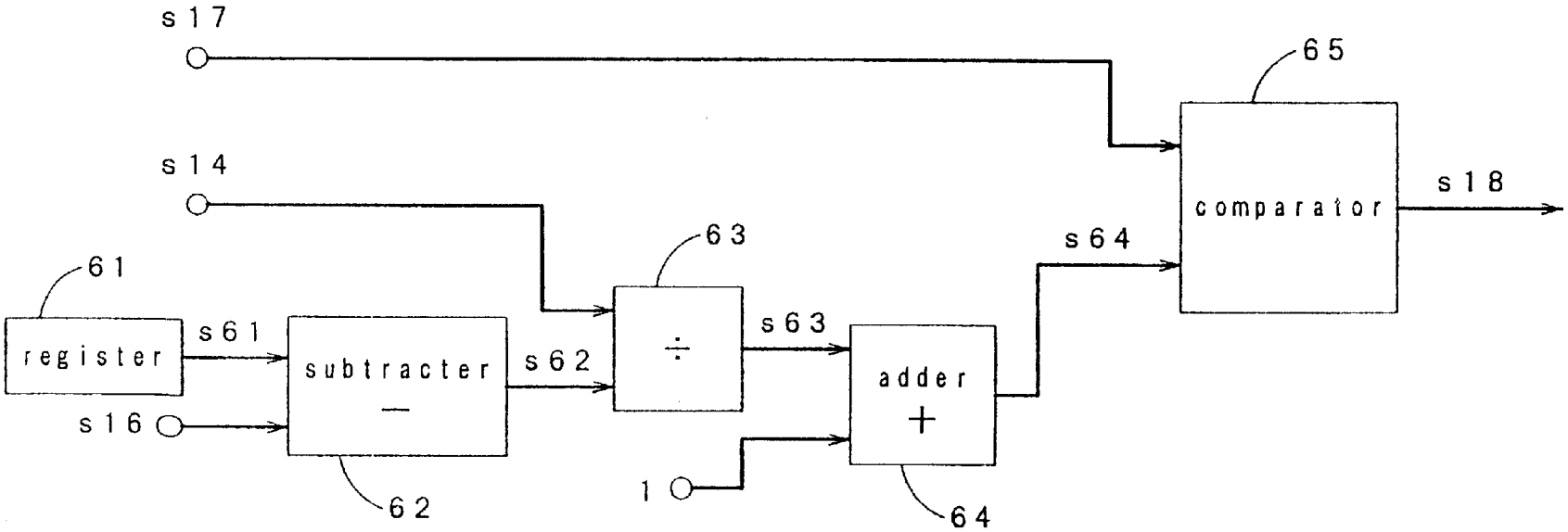
FIG. 6 is a block diagram of a coring circuit in accordance with the third embodiment.

FIG. 6 is a block diagram of the coring circuit 58 of the exposure controller in accordance with the third embodiment. Referring to FIG. 6, numeral 61 represents a register, numeral 62 represents a subtracter for subtracting sub s16 from the value of the register 61, numeral 63 represents a divider for dividing the target value s14 by the output s62 of the subtracter 62, numeral 64 represents an adder for adding 1 to the value s63 obtained by the divider, and numeral 65 represents a comparator for comparing this added value (hereinafter referred to as a coring value) s64 with the luminance level error s17.

The operation of the coring circuit of the third embodiment having the above-mentioned configuration is described below. The register 61 has stored the number of scanning lines per field. The subtracter 62 subtracts sub s16 from the value s61 of the register 61. By dividing the target value s14 by the result s62 of the subtraction, the following equation can be established:

target value s14/(the number of scanning lines per field−sub s16) (Equation 61)

Equation 61 indicates the amount of change in the luminance level s13 when sub s16 is changed by 1, and 1 is added to the amount by the adder 64, and then the following equation can be established:

target value s14/(the number of scanning lines per field−sub s16)+1 (Equation 62)

the value represented by this equation is defined as a coring value s64. The comparator 65 compares the luminance level error s17 with the coring value s64, and when luminance level error s17>coring value s64 the comparator 65 outputs 0, or when luminance level error s17≦coring value s64 the comparator 65 outputs 1, and this output value is output as the discharge pulse hold signal s18.

As described above, the electronic-iris type exposure controller of the third embodiment is provided with the coring circuit 64 which obtains the amount of change in the luminance level s13 when sub s16 is changed by 1, adds 1 to this amount and defines the result of the addition as the coring value s64. This exposure controller can be embodied as an exposure controller free from hunting by using a coring value adapted to the value of sub s16.

Figure 7:
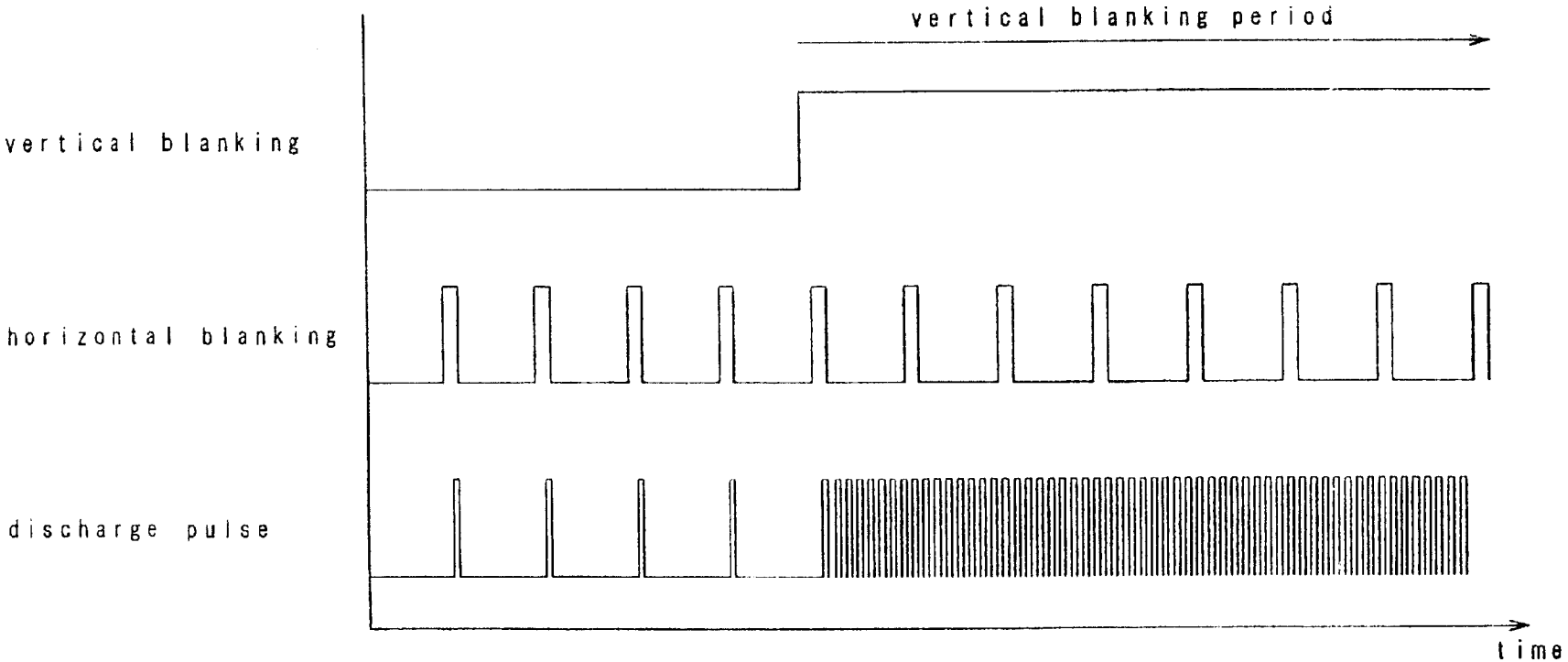
FIG. 7 is a schematic diagram showing the output timing of drive pulses at a drive pulse generator circuit.

FIG. 7 is a schematic diagram showing the output timing of drive pulses at the drive pulse generator circuits 19, 39 of the exposure controller in accordance with the first, second and third embodiments. As shown in FIG. 7, outside a vertical blanking period, the drive pulse generator circuits 19, 39 output one discharge pulse during each horizontal blanking period. Within the vertical blanking period, the drive pulse generator circuits 19, 39 output discharge pulses during effective scanning periods, as well as during the horizontal blanking periods. Because of these characteristics, even when exposure is controlled in a very high electronic shutter speed condition wherein discharge pulses are output within the vertical blanking period, the change rate of the luminance level of the pickup image in accordance with the change in the number of the discharge pulses can be decreased, whereby exposure can be controlled by using fewer coring values.

Figure 8:
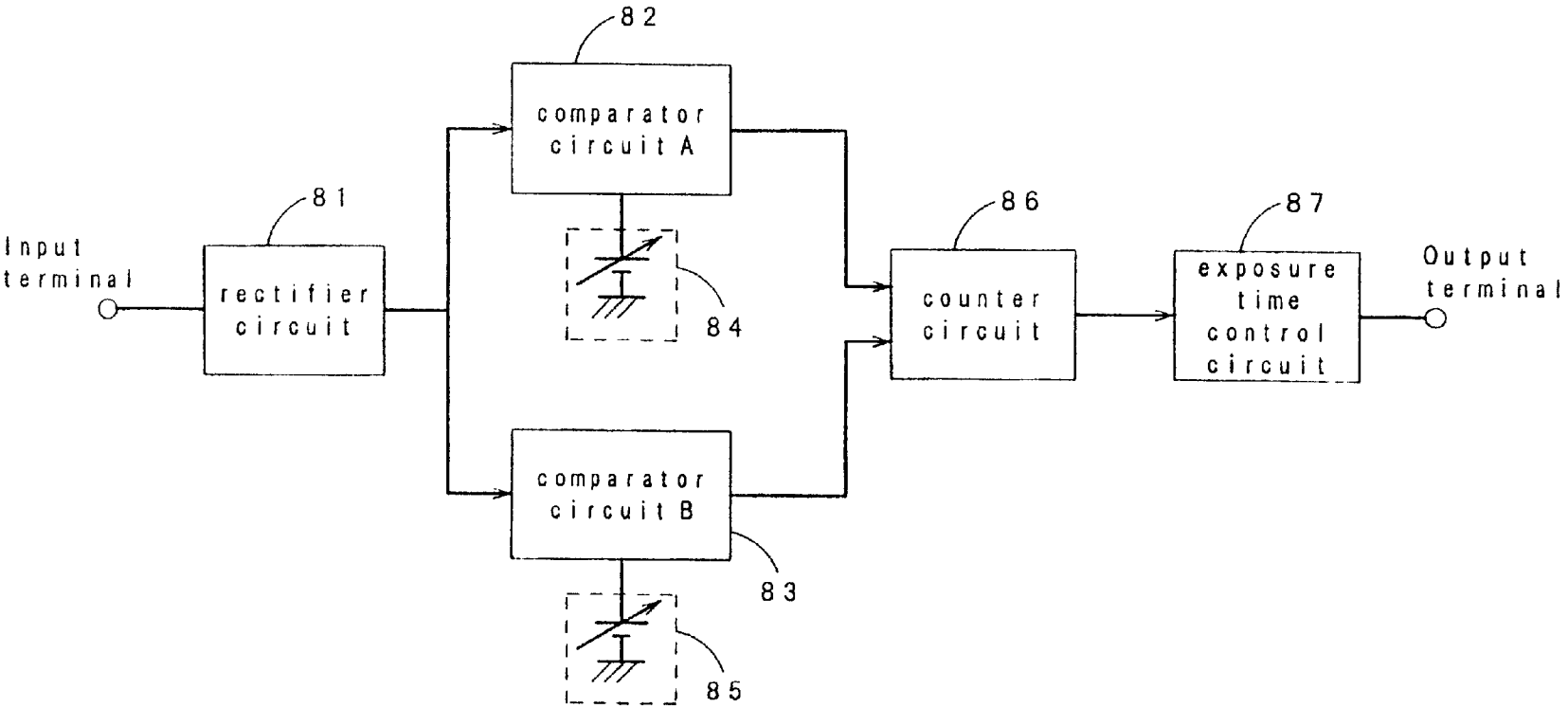
FIG. 8 is a block diagram of a conventional exposure controller.

FIG. 1
11 solid-state image pickup device
12 ad converter
13 luminance level detector circuit
14 target value
15 subtracter
17 absolute value circuit
18 core ring circuit
16 discharge pulse calculation circuit
19 drive pulse generator circuit
FIG. 2
21 6-bit shifter
22 adder
23 comparator
FIG. 4
40 register
44 selector FIG. 7
1 vertical blanking
2 horizontal blanking
3 discharge pulse
4 vertical blanking period
5 time
FIG. 8
1 input terminal
2 output terminal
81 rectifier circuit
82 comparator circuit a
86 counter circuit
87 exposure time control circuit

What is claimed is:

1. An exposure controller comprising:

a lens, a solid-state image pickup device for picking up the image of light having passed through said lens, an AD converter for converting said image picked up by said solid-state image pickup device into a digital signal, a luminance level detector circuit for detecting the luminance level of said image signal digitized by said AD converter, a subtracter for calculating the difference between said luminance level detected by said luminance level detector circuit and a target value of said luminance level stored in a register inside said controller, a discharge pulse calculation circuit for calculating a discharge pulse count to be output to said solid-state image pickup device within one field period, an absolute value circuit for calculating the absolute value of said difference between said luminance level and said target value of said luminance level to be output from said subtracter, a coring circuit for defining a quotient obtained from said discharge pulse count divided by a predetermined setting value and plus 1 as a coring value, for setting said discharge pulse hold signal at H when said coring value is larger than said luminance level error, or at L in other cases, and for outputting said discharge pulse hold signal, and a drive pulse generator circuit for converting said discharge pulse count into a discharge pulse signal and for outputting said discharge pulse signal to said solid-state image pickup device, wherein said discharge pulse calculation circuit calculates said discharge pulse count to be output to said solid-state image pickup device within one field period on the basis of the polarity of said difference between said luminance level and said target value of said luminance level to be output by said subtracter and said discharge pulse hold signal to be output from said coring circuit without changing said discharge pulse count when said discharge pulse hold signal is H, or depending on the polarity of said difference between said luminance level and said target value of said luminance level to be output from said subtracter when said discharge pulse hold signal is L, and outputs said discharge pulse count.

2. An exposure controller according to claim 1, wherein said coring circuit comprises a bit shifter for bit-shifting said discharge pulse count to its LSB side, an adder for adding 1 to the value output by said bit shifter, and a comparator for comparing the value obtained by said adder with said luminance level error and for outputting 1 when said coring value is larger than said luminance level error, or 1 in other cases.

3. An exposure controller according to claim 1, wherein outside a vertical blanking period, said drive pulse generator circuit outputs one discharge pulse during each horizontal blanking period, and within said vertical blanking period, said drive pulse generator circuit outputs discharge pulses during effective scanning periods as well as during said horizontal blanking periods.

4. An exposure controller comprising:

a lens, a solid-state image pickup device for picking up the image of light having passed through said lens, an AD converter for converting said image picked up by said solid-state image pickup device into a digital signal, a luminance level detector circuit for detecting the luminance level of said image signal digitized by said AD converter, a subtracter for calculating the difference between said luminance level detected by said luminance level detector circuit and a target value of said luminance level stored in a first register inside said controller, a discharge pulse calculation circuit for calculating a discharge pulse count to be output to said solid-state image pickup device within one field period, an absolute value circuit for calculating the absolute value of said difference between said luminance level and said target value of said luminance level to be output from said subtracter, a coring circuit, which has second, third and fourth registers, for defining the value of said third register as a coring value when said discharge pulse count is not more than the value stored in said second register or for defining the value of said fourth register as said coring value when said discharge pulse count is more than said value stored in said second register, for setting said discharge pulse hold signal at H when said coring value is larger than said luminance level error, or at L in other cases, and for outputting said discharge pulse hold signal, and a drive pulse generator circuit for converting said discharge pulse count into a discharge pulse signal and for outputting said discharge pulse signal to said solid-state image pickup device, wherein said discharge pulse calculation circuit calculates said discharge pulse count to be output to said solid-state image pickup device within one field period on the basis of the polarity of said difference between said luminance level and said target value of said luminance level to be output by said subtracter and said discharge pulse hold signal to be output from said coring circuit without changing said discharge pulse count when said discharge pulse hold signal is H, or depending on the polarity of said difference between said luminance level and said target value of said luminance level to be output from said subtracter when said discharge pulse hold signal is L, and outputs said discharge pulse count.

5. An exposure controller according to claim 4, wherein said coring circuit comprises a first comparator for comparing said discharge pulse count with said value of said second register and for outputting 1 when said discharge pulse count is larger than said value of said second register, or 0 in other cases, a selector for outputting said value of said third register when the output value of said second register is 1 or for outputting said value of said fourth register when said output value of said second register is 0, and a second comparator for comparing the value, i.e. a coring value, having been output by said selector with said luminance level error, and for outputting 1 when said coring value is larger than said luminance level error and for outputting 0 in other cases.

6. An exposure controller according to claim 4, wherein outside a vertical blanking period, said drive pulse generator circuit outputs one discharge pulse during each horizontal blanking period, and within said vertical blanking period, said drive pulse generator circuit outputs discharge pulses during effective scanning periods as well as during said horizontal blanking periods.

7. An exposure controller comprising:

a lens, a solid-state image pickup device for picking up the image of light having passed through said lens, an AD converter for converting said image picked up by said solid-state image pickup device into a digital signal, a luminance level detector circuit for detecting the luminance level of said image signal digitized by said AD converter, a subtracter for calculating the difference between said luminance level detected by said luminance level detector circuit and a target value of said luminance level stored in a register inside said controller, a discharge pulse calculation circuit for calculating a discharge pulse count to be output to said solid-state image pickup device within one field period, an absolute value circuit for calculating the absolute value of said difference between said luminance level and said target value of said luminance level to be output from said subtracter, a coring circuit for defining a coring value obtained by multiplying said target value by the reciprocal of the difference between the number of scanning lines in one field and said discharge pulse count and plus 1, for setting said discharge pulse hold signal at H when said coring value is larger than said luminance level error, or at L in other cases, and for outputting said discharge pulse hold signal, and a drive pulse generator circuit for converting said discharge pulse count into a discharge pulse signal and for outputting said discharge pulse signal to said solid-state image pickup device, wherein said discharge pulse calculation circuit calculates said discharge pulse count to be output to said solid-state image pickup device within one field period on the basis of the polarity of said difference between said luminance level and said target value of said luminance level to be output by said subtracter and said discharge pulse hold signal to be output from said coring circuit without changing said discharge pulse count when said discharge pulse hold signal is H, or depending on said difference between said luminance level and said target value of said luminance level to be output from said subtracter when said discharge pulse hold signal is L, and outputs said discharge pulse count.

8. An exposure controller according to claim 7, wherein said coring circuit comprises a register, a subtracter for subtracting said discharge pulse count from the value of said register, a divider for dividing said target value by the output of said subtracter, an adder for adding 1 to the value obtained by said divider, and a comparator for comparing said luminance level error with the value obtained by said divider and added by one by said adder, i. e. a coring value, and for outputting 1 when said coring value is larger than said luminance level error, or 0 in other cases.

9. An exposure controller according to claim 7, wherein outside a vertical blanking period, said drive pulse generator circuit outputs one discharge pulse during each horizontal blanking period, and within said vertical blanking period, said drive pulse generator circuit outputs discharge pulses during effective scanning periods as well as during said horizontal blanking periods.

*10. An exposure controller comprising:*

*a lens,*

*a solid-state image pickup device for picking up the image of light having passed through said lens,*

*an AD converter for converting said image picked up by said solid-state image pickup device into a digital signal,*

*a luminance level detector circuit for detecting the luminance level of said image signal digitized by said AD converter,*

*a subtracter for calculating the difference between said luminance level detected by said luminance level detector circuit and a target value of said luminance level stored in a register inside said controller,*

*a discharge pulse calculation circuit for calculating a discharge pulse count to be output to said solid-state image pickup device within one field period,*

*an absolute value circuit for calculating the absolute value of said difference between said luminance level and said target value of said luminance level to be output from said subtracter and defining said absolute value as a luminance level error,*

*a coring circuit for defining a coring value by a value controlled on the basis of said discharge pulse count, for setting a discharge pulse hold signal at H when said coring value is larger than said luminance level error, or at L in other cases, and for outputting said discharge pulse hold signal, and*

*a drive pulse generator circuit for converting said discharge pulse count into a discharge pulse signal and for outputting said discharge pulse signal to said solid-state image pickup device,*

*wherein said coring value is controlled so as to be large when said discharge pulse count is large, or to be small when said discharge pulse count is small, and*

*wherein said discharge pulse calculation circuit calculates said discharge pulse count to be output to said solid-state image pickup device within one field period on the basis of the polarity of said difference between said luminance level and said target value of said luminance level to be output by said subtracter and said discharge pulse hold signal to be output from said coring circuit without changing said discharge pulse count when said discharge pulse hold signal is H, or depending on the polarity of said difference between said luminance level and said target value of said luminance level to be output from said subtracter when said discharge pulse hold signal is L, and outputs said discharge pulse count.*

*11. An exposure controlling method comprising the steps of:*

*converting an image picked up by a solid-state image pickup device into a digital signal,*

*detecting a luminance level of said digital signal,*

*calculating a difference between said luminance level and a target value of said luminance level stored in a register inside a controller,*

*calculating a discharge pulse count to be output to the solid-state image pickup device within one field period,*

*calculating the absolute value of said difference between said luminance level and said target value of said luminance level and defining said absolute value as a luminance level error,*

*defining a coring value by a value controlled on the basis of said discharge pulse count,*

*setting a discharge pulse hold signal at H when said coring value is larger than said luminance level error, or at L in other cases,*

*outputting said discharge pulse hold signal, and*

*converting said discharge pulse count into a discharge pulse signal and outputting said discharge pulse signal to the solid-state image pickup device,*

*wherein said coring value is controlled so as to be large when said discharge pulse count is large, or to be small when said discharge pulse count is small, and*

*wherein said step of calculating said discharge pulse count to be output to the solid-state image pickup device within one field period includes calculating said discharge pulse count on the basis of the polarity of said difference between said luminance level and said target value of said luminance level and said discharge pulse hold signal without changing said discharge pulse count when said discharge pulse hold signal is H, or depending on the polarity of said difference between said luminance level and said target value of said luminance level when said discharge pulse hold signal is L.*

*12. An exposure controller comprising:*

*a luminance level detector circuit for detecting the luminance level of an image signal picked up by a solid-state image pickup device,*

*a subtracter for calculating the difference between said luminance level detected by said luminance level detector circuit and a target value of said luminance level stored in a register inside a controller,*

*a discharge pulse calculation circuit for calculating a discharge pulse count to be output to the solid-state image pickup device within one field period,*

*an absolute value circuit for calculating the absolute value of said difference between said luminance level and said target value of said luminance level to be output from said subtracter and defining said absolute value as a luminance level error, and*

*a coring circuit for defining a coring value by a value controlled on the basis of said discharge pulse count, for setting a discharge pulse hold signal at H when said coring value is larger than said luminance level error, or at L in other cases, and for outputting said discharge pulse hold signal,*

*wherein said coring value is controlled so as to be large when said discharge pulse count is larger, or to be small when said discharge pulse count is small, and*

*wherein said discharge pulse calculation circuit calculates said discharge pulse count to be output to said solid-state image pickup device within one field period on the basis of the polarity of said difference between said luminance level and said target value of said luminance level to be output by said subtracter and said discharge pulse hold signal to be output from said coring circuit without changing said discharge pulse count when said discharge pulse hold signal is H, or depending on the polarity of said difference between said luminance level and said target value of said luminance level to be output from said subtracter when said discharge pulse hold signal is L, and outputs said discharge pulse count.*

* * * * *